(12) United States Patent
Sandu et al.

(10) Patent No.: US 8,774,202 B2
(45) Date of Patent: Jul. 8, 2014

(54) METHODS, SYSTEMS, AND COMPUTER READABLE MEDIA FOR GENERATING GENERAL PACKET RADIO SERVICE TUNNELING PROTOCOL (GTP) ENCAPSULATED REAL-TIME TRANSPORT PROTOCOL (RTP) PACKETS IN A LONG TERM EVOLUTION (LTE) NODE SIMULATOR

(75) Inventors: Andrei Mihail Sandu, Bucharest (RO); Catalina Macalet, Bucharest (RO); Claudia Ioana Tanase, Slatina (RO); Radu Bulboaca, Bucharest (RO)

(73) Assignee: Ixia, Calabasas, CA (US)

( * ) Notice: Subject to any disclaimer, the term of this patent is extended or adjusted under 35 U.S.C. 154(b) by 67 days.

(21) Appl. No.: 13/469,057

(22) Filed: May 10, 2012

(65) Prior Publication Data
US 2013/0301419 A1 Nov. 14, 2013

(51) Int. Cl.
*H04L 12/28* (2006.01)

(52) U.S. Cl.
USPC .................. 370/409; 370/329; 370/401

(58) Field of Classification Search
USPC ............... 370/328–330, 400, 401, 409
See application file for complete search history.

(56) References Cited

U.S. PATENT DOCUMENTS

| | | | |
|---|---|---|---|
| 8,229,416 B2* | 7/2012 | Akman et al. | 455/423 |
| 2009/0022107 A1* | 1/2009 | Kapoor et al. | 370/331 |
| 2012/0218899 A1* | 8/2012 | Ozawa | 370/237 |
| 2012/0300615 A1* | 11/2012 | Kempf et al. | 370/216 |
| 2013/0287021 A1* | 10/2013 | Bulboaca et al. | 370/389 |

OTHER PUBLICATIONS

"IxLoad™; GGSN Testing," http://www.ixiacom.com/products/display?skey=ixload_ggsn_testing, P/N: 915-1749-01, Rev D, pp. 1-7 (Mar. 2011).

"Digital cellular telecommunications system (Phase 2+); General Packet Radio Service (GPRS); GPRS Tunnelling Protocol (GTP) across the Gn and Gp Interface; (GSM 09.60 version 6.2.0 Release 1997)," GSM 09.60, V6.2.0, pp. 1-65 (Nov. 1998).

* cited by examiner

*Primary Examiner* — Kerri Rose
(74) *Attorney, Agent, or Firm* — Jenkins, Wilson, Taylor & Hunt, P.A.

(57) ABSTRACT

The subject matter described herein includes methods, systems, and computer readable media for generating GTP encapsulated RTP packets in an LTE node simulator. According to one method, and LTE node simulator uses a first processing unit to generate prepackaged headers for RTP payloads. The first processing unit communicates the prepackaged headers to a second processing unit separate from the first processing unit within the LTE node simulator. The second processing unit assembles GTP packets by combining the prepackaged headers with the RTP payloads. The second processing unit transmits the GTP packets to a device under test.

24 Claims, 6 Drawing Sheets

Before:
```
0000  00 1e 00 00 01 00 00 1e 00 02 01 00 08 00 45 28
0010  00 6e 00 00 40 00 40 11 fc 55 1e 00 02 01 1e 00
0020  00 01 08 68 08 68 00 5a 00 00 30 ff 00 4a 00 00
0030  00 26 60 00 00 00 00 22 11 40 00 00 00 00 00 00
0040  00 00 00 00 00 00 16 16 16 16 00 00 00 00 00 00
0050  00 00 00 00 00 00 ac 10 00 65 27 10 27 10 00 22
0060  8d c6 80 62 6c 93 00 00 08 da a4 fa a4 f1 f0 04
0070  4e 8e 5d 38 13 da 79 09 79 20 69 96
```

After:
```
0000  00 1e 00 00 01 00 00 1e 00 02 01 00 08 00 45 28
0010  00 6e 00 00 40 00 40 11 fc 55 1e 00 02 17 1e 00
0020  00 01 08 68 08 68 00 5a 00 00 30 ff 00 4a 00 00
0030  00 26 60 00 00 00 00 22 11 40 00 00 00 00 00 00
0040  00 00 00 00 00 00 16 16 16 16 00 00 00 00 00 00
0050  00 00 00 00 00 00 ac 10 00 65 27 10 27 10 00 22
0060  8d c6 80 62 6c 93 00 00 08 da a4 fa a4 f1 f0 04
0070  4e 8e 5d 38 13 da 79 09 79 20 69 96
```

METHODS, SYSTEMS, AND COMPUTER READABLE MEDIA FOR GENERATING GENERAL PACKET RADIO SERVICE TUNNELING PROTOCOL (GTP) ENCAPSULATED REAL-TIME TRANSPORT PROTOCOL (RTP) PACKETS IN A LONG TERM EVOLUTION (LTE) NODE SIMULATOR

TECHNICAL FIELD

The subject matter described herein relates to generating simulated GTP packets. More particularly, the subject matter described herein relates to methods, systems, and computer readable media for generating GTP encapsulated RTP packets in an LTE node simulator.

BACKGROUND

In communications networks, such as LTE networks, network components are often tested using devices that generate test packets, send the packets to a device under test, receive responsive packets from the device under test, and generate statistics indicative of the performance of the device under test. For example, in LTE networks, it may be desirable to test the functionality of a serving gateway (SGW) by sending streams of test packets to the SGW. In some tests, the streams of test packets mimic the traffic that would be received by such a node if the node were operating in a live network. In other tests, the goal is to send streams of packets that test the extremes of the operational capabilities or stress test the device under test.

Testing the functionality of a network component, such as an SGW, involves formulating packets that include various protocol layers. Two types of protocol packets that are received by an SGW are RTP packets and GTP encapsulated RTP packets. RTP packets carry or transport media data for real-time applications, such as audio, video, or voice over IP applications. In LTE networks, the GTP protocol is used to tunnel user plane and signaling packets between tunnel endpoints. For example, one tunnel endpoint can be an eNode B, and the other tunnel endpoint can be a serving gateway, GTP packets each include a GTP header that identifies the tunnel endpoints. When one of the tunnel endpoints changes, the GTP header changes. For example, when a user element (UE) moves from one radio tower to another, the originating IP address for the tower changes. Another example of when the GTP header changes is when traffic starts using a different bearer channel from a current bearer channel. Such a switch can occur when a dedicated bearer is established, is deleted, and the traffic continues to be transmitted over a default bearer. The terminal endpoint identifier (TEID) in the GTP header changes when the switch from the dedicated bearer to the default bearer occurs.

It is desirable for equipment that generates simulated GTP packets to be able to efficiently generate the packets and also to efficiently update the generation of the packets when an IP address or other aspect of a GTP header changes for a given stream.

Accordingly, there exists a need for methods, systems, and computer readable media for generating GTP encapsulated RTP packets in an LTE node simulator.

SUMMARY

The subject matter described herein includes methods, systems, and computer readable media for generating GTP encapsulated RTP packets at an LTE node simulator. According to one method, an LTE node simulator uses a first processing unit to generate prepackaged headers for RTP payloads. The first processing unit communicates the RTP payloads and the prepackaged header to a second processing unit separate from the first processing unit within the LTE node simulator. The second processing unit generates GTP packets by combining the prepackaged headers with the RTP payloads. The second processing unit transmits the GTP packets to a device under test. In one example, the prepackaged header includes the GTP header, the RTP header, the UDP header, the IP header and the MAC header.

The term "GTP", as used herein, is intended to include the GPRS tunneling protocol, included any extended or subsequent versions of that protocol, such as eGTP, and any other tunneling protocol that is used to tunnel packets between radio access network elements and core network elements.

The term "LTE node simulator" is intended to refer to a network simulation device that simulates one or more LTE nodes, such as eNode Bs, MMEs, mobile handsets, etc.

The subject matter described herein for generating GTP encapsulated RTP packets in an LTE node simulator may be implemented in hardware or firmware in combination with software. In one exemplary implementation, the subject matter described herein for generating GTP encapsulated RTP packets is implemented using first and second processing units. Each processing unit may include a separate unit of hardware or firmware that performs a function associated with the generation of GTP encapsulated RTP packets. In one exemplary implementation, a central processing unit generates RTP payloads and prepackaged headers for the RTP payloads. A field programmable gate array (FPGA) separate from the CPU generates GTP packets by combining the prepackaged headers with the RTP payloads and transmits the GTP packets to the device under test.

The subject matter described herein for generating GTP encapsulated RTP packets can be implemented in a non-transitory computer readable media. Exemplary computer readable media suitable for implementing the subject matter described herein include chip memory devices, disk memory devices, programmable logic devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
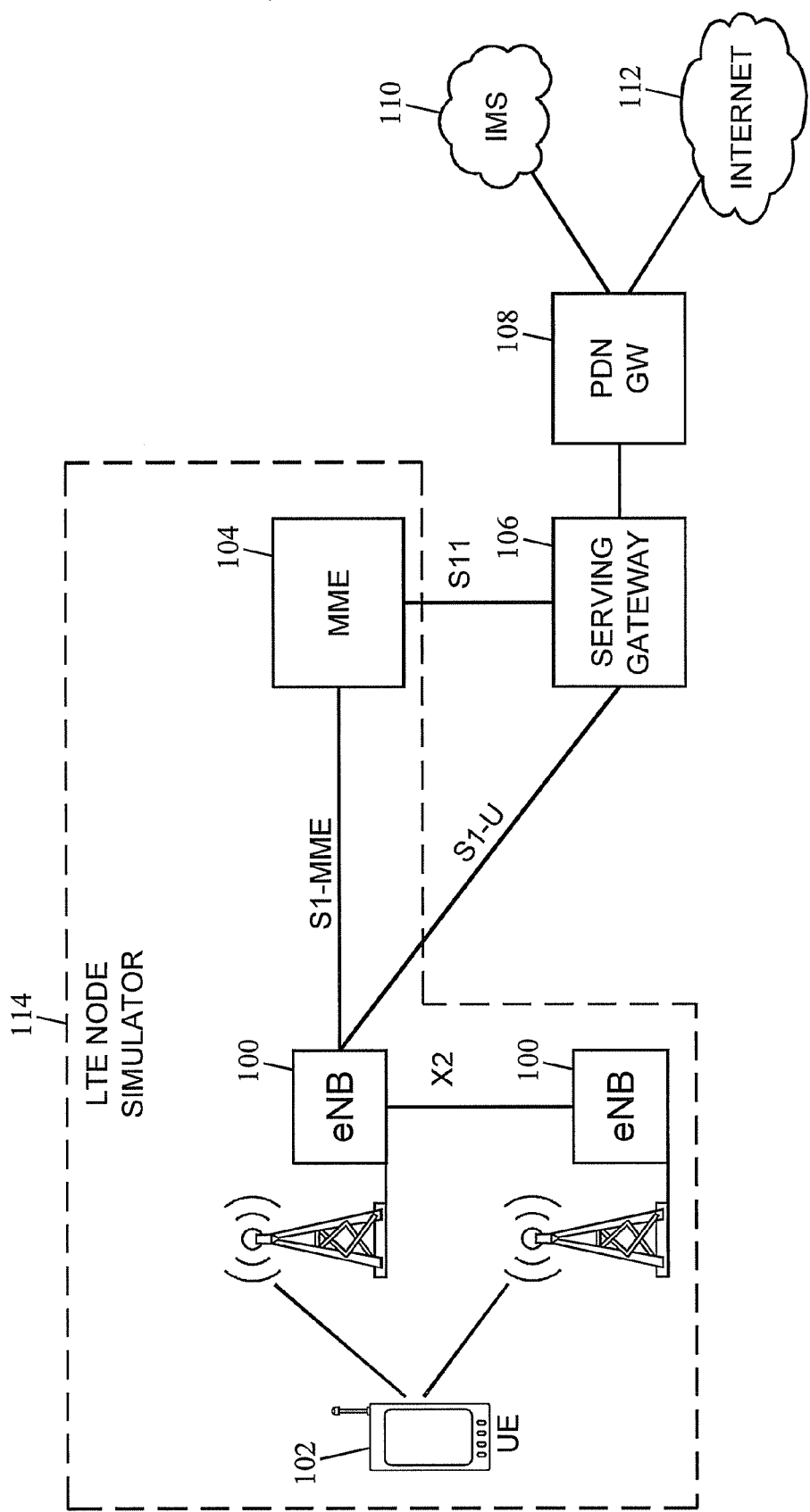
FIG. 1 is a block diagram of an LTE network and an LTE node simulator according to an embodiment of the subject matter described herein.

Methods, systems, and computer readable media for generating GTP encapsulated RTP packets in an LTE node simulator are disclosed. FIG. 1 is a network diagram illustrating exemplary components of an LTE network and examples of components that may be simulated by an LTE node simulator according to an embodiment of the subject matter described herein. Referring to FIG. 1, the LTE network includes evolved Node Bs (eNode Bs) 100 that serve as the radio interface to user equipment (UE) 102. eNode Bs 100 also communicate with an MME 104 and an SGW 106. SGW 106 receives media data from the eNode Bs relating to communications to or from UE 102. MME 104 receives signaling from eNode Bs 100 relating to UE 102. A packet data network gateway 108 serves as an interface between serving gateway 106 and packet networks, such as IP multimedia subsystem (IMS) network 110 and the Internet 112.

An LTE node simulator 114 may emulate the functions of one or more UEs 102, eNode Bs 100, and MMEs 104 to test the functionality of SGW 106. For example, LTE node simulator 114 may generate simulated signaling and media packets, forward those packets to SGW 106, may receive responsive packets from SGW 106, and may generate statistics or other performance metrics based on the received packets.

Figure 2A:
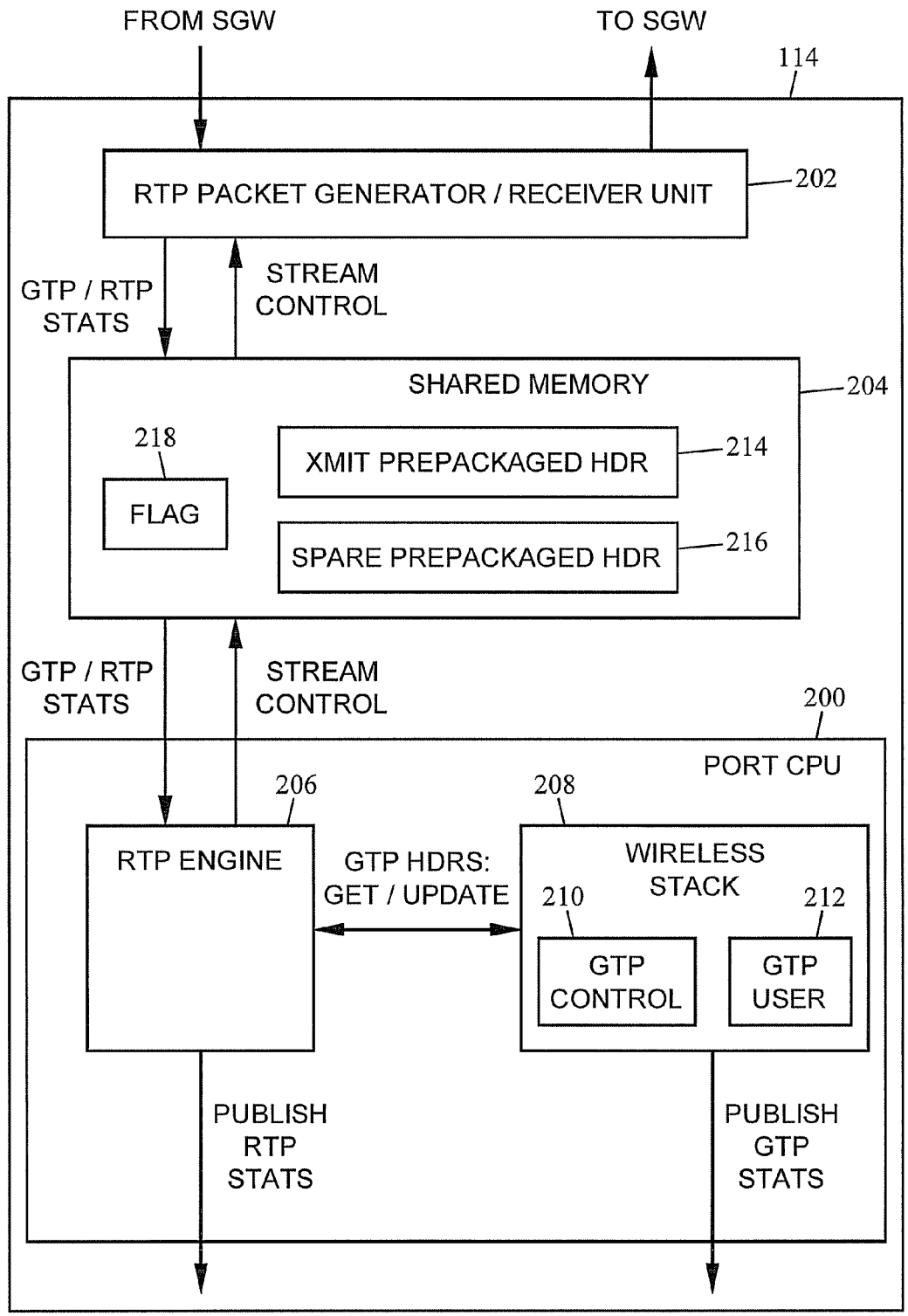
FIG. 2A is a block diagram of an LTE node simulator according to an embodiment of the subject matter described herein.

As stated above, two protocols that may be desirable to simulate are RTP and GTP. FIG. 2A is a block diagram illustrating an exemplary internal architecture for LTE node simulator 114 that generates simulated GTP encapsulated RTP packets. Referring to FIG. 2, LTE node simulator 114 includes a port CPU 200 and a RTP packet generator/receiver unit 202 that communicate with each other via shared memory 204. Port CPU 200 may perform the functions of generating RTP packets and generating GTP headers. Port CPU 200 includes or implements an RTP engine 206 and a wireless stack 208. RTP engine 206 receives GTP headers and header updates from wireless stack 208 and communicates those headers to RTP packet generator/receiver unit 202 via shared memory 204. Wireless stack 208 includes a GTP control plane unit 210 and a GTP user plane unit 212. GTP user plane unit 212 manages encapsulation data in sync with GTP control plane unit 210 and generates the prepackaged headers for encapsulation. RTP payloads may be generated by a software module executed by port CPU 200 or by a hardware or firmware module separate from port CPU 200.

In one exemplary implementation, RTP packet generator/receiver unit 202 includes sixteen network processors including four transmit processors that transmit simulated GTP encapsulated RTP packets to devices under test and twelve receive processors for receiving GTP encapsulated RTP packets from devices under test. It is understood that more or fewer communication ports can be supported by replicating the architecture illustrated in FIG. 2 for more ports or decreasing the number of transmit and received processors to support fewer ports. A multi-port LTE node simulator or a single port LTE node simulator is intended to be within the scope of the subject matter described herein.

Rather than assembling the entire GTP-encapsulated RTP packet using port CPU 200, the embodiment illustrated in FIG. 2 offloads the GTP packet assembly function to RTP packet generator/receiver unit 202. In particular, RTP packet generator/receiver unit 202 assembles GTP encapsulated RTP packets using prepackaged complete headers generated by port CPU 200. Each prepackaged complete header includes the GTP header and the RTP header, as well as the IP and UDP headers. RTP packet generator/receiver unit 202 may not implement any GTP processing or control logic other than the ability to assemble packets using prepackaged headers and RTP payloads. RTP packet generator/receiver unit 202 may be capable of generating checksums for outgoing GTP packets and may be capable of parsing both outgoing and incoming GTP packets for statistics generation purposes. In one example, RTP packet generator/receiver unit 202 generates GTP and RTP statistics based on packets transmitted to and received from the network. Examples of statistics that may be generated include the number of GTP packets transmitted and received, the number of RTP packets transmitted and received, the tunnel IP address from the GTP header, the number of bytes transmitted and received, etc.

According to one aspect of the subject matter described herein, port CPU 200 and RTP packet generator/receiver unit 202 perform dynamic updating of GTP headers during the transmission of a stream of GTP packets relating to the same UE. For example, when simulating any event where a GTP header changes, such as a mobility event, which may include a handover, the IP address in the GTP header changes from the IP address of the old eNode B to the IP address of the new eNode B. In order to effect this change without stopping the transmission of GTP packets, port CPU 200 maintains a transmit prepackaged header data store 214, a spare prepackaged header data store 216, and a flag 218 in shared memory 204. Transmit prepackaged header data store 214 stores the prepackaged header used by RTP packet generator/receiver unit 202 as the header for the transmit stream. Spare prepackaged header data store 216 is used by port CPU 200 to write the updated prepackaged header. The updated prepackaged header may include one or more of an updated source and destination MAC address, an updated outer source and destination IP address, an updated inner source and destination IP address, an updated TEID, and an updated type of service/differentiated services code point (ToS/DSCP) parameter value. Flag 218 is used to switch the roles of transmit prepackaged header data store 214 and spare prepackaged header data store 216. Thus, when port CPU 200 determines that a mobility event has occurred, port CPU 200 writes the new prepackaged header, including the updated prepackaged header, to spare prepackaged header data store 216. After writing the spare prepackaged header, port CPU 200 modifies flag 218 to direct RTP packet generator/receiver unit 202 to use the information stored in spare prepackaged header data store 216 for the transmit stream. Transmit prepackaged header data store 214 then becomes the spare prepackaged header data store. When transmitting packets, RTP packet generator/receiver unit 202 first reads flag 218 to determine which data store contains the prepackaged header to use for the transmit stream.

Figure 2B:
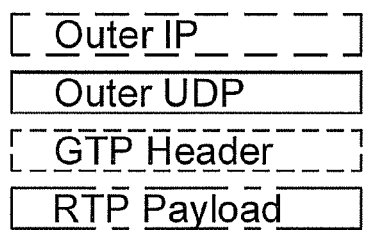
FIG. 2B illustrates and example of a prepackaged header before and after a change in eNode B IP address caused by a simulated handover event according to an embodiment of the subject matter described herein.

FIG. 2B is a diagram of an updated prepackaged header before and after a change in eNode B IP address caused by a simulated handover event according to an embodiment of the subject matter described herein. Referring to FIG. 2B, the uppermost group of numbers is hexadecimal data for a prepackaged header before the change in source eNode B IP address. As indicated by the solid and dashed boxes, the prepackaged hearer includes an outer IP header, an outer UDP header, a GTP header, and an RTP payload. The lowermost group of numbers is hexadecimal data for the prepackaged header after a change in eNode B IP address caused by a simulated handover event. As indicated by the bold numbers in the outer IP header, the source IP address in the outer IP header changes to the IP address of the target eNode B to which the simulated session has been handed over.

Figure 3:
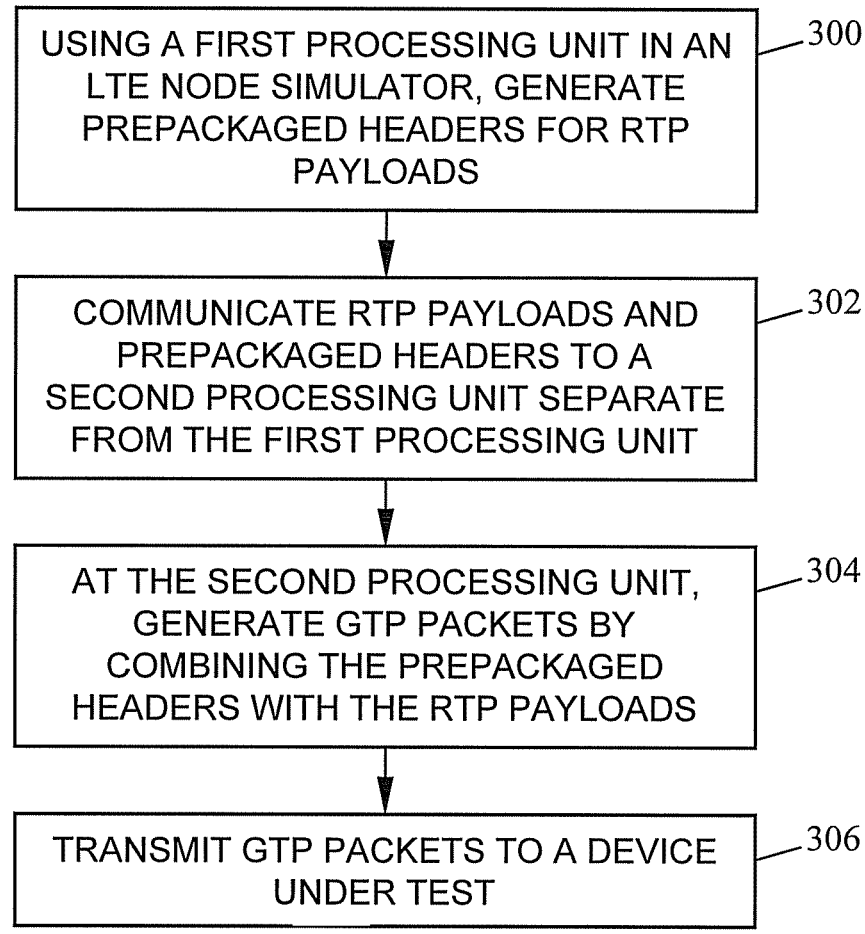
FIG. 3 is a flow chart illustrating an exemplary process for generating GTP encapsulated RTP packets in an LTE node simulator according to an embodiment of the subject matter described herein.

FIG. 3 is a flow chart illustrating exemplary overall steps for transmitting GTP-encapsulated RTP packets according to an embodiment of the subject matter described herein. Referring to FIG. 3, in step 300, a first processing unit in an LTE node simulator generates prepackaged headers for RTP payloads. For example, referring to FIG. 2, port CPU 200 may formulate a prepackaged header including the GTP, RTP, UDP, IP and MAC headers for RTP payloads to be transmitted to a device under test. In step 302, the first processing unit communicates the prepackaged headers to a second processing unit separate from the first processing unit. Referring to FIG. 2, port CPU 200 communicates the RTP GTP headers to RTP packet generator/receiver unit 202 via shared memory 204.

In step 304, the second processing unit generates GTP packets by combining the prepackaged headers with the RTP payloads. In FIG. 2, RTP packet generator/receiver unit 202 combines prepackaged headers generated by port CPU 200 to RTP payloads, which may be generated by port CPU 200 or by a separate processor. In step 306, GTP packets are transmitted to a device under test. In FIG. 2, RTP packet generator/receiver unit 202 transmits the GTP encapsulated RTP packets to the SGW under test.

Figure 4A:
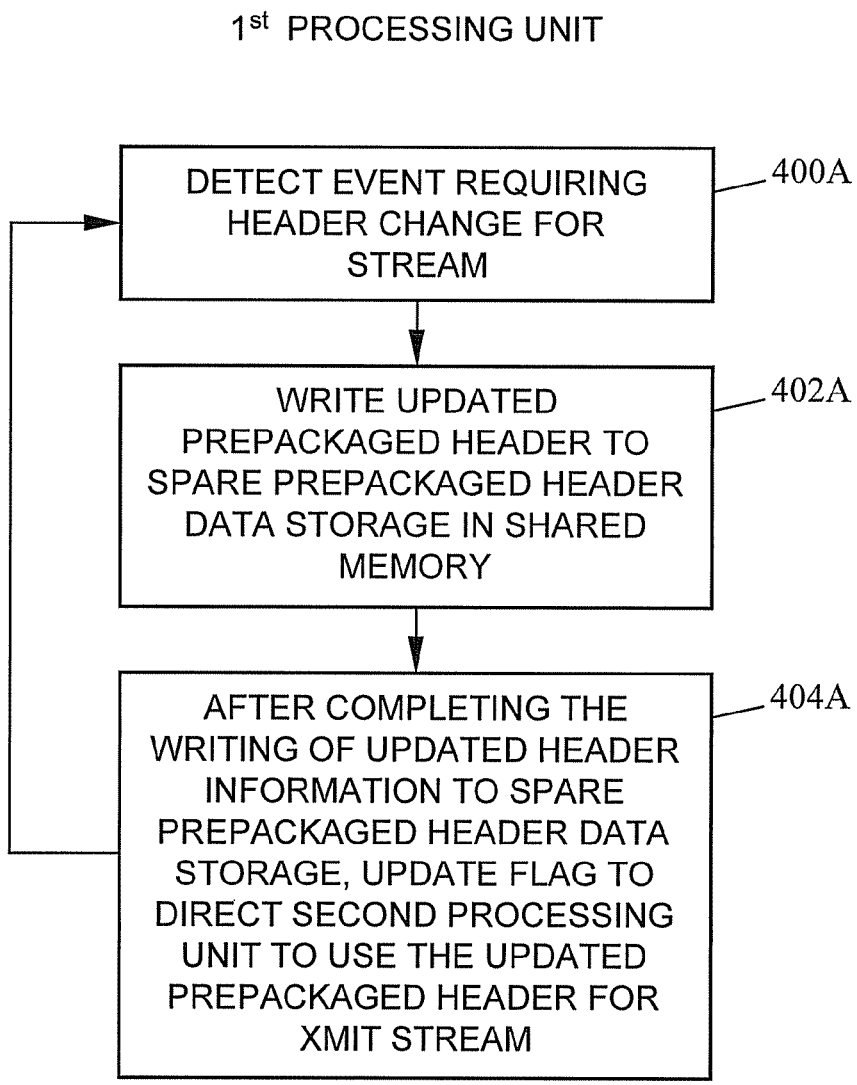
FIGS. 4A and 4B are a flow chart illustrating the dynamic updating of GTP headers during transmission of a stream according to an embodiment of the subject matter described herein.
Figure 4B:
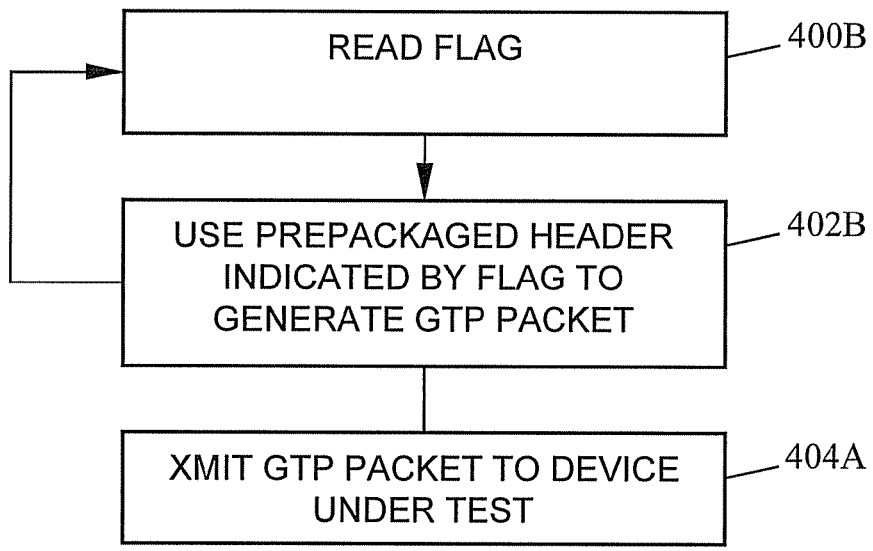

FIGS. 4A and 4B illustrate exemplary steps for dynamically updating the prepackaged header in an RTP stream during transmission of the stream. In particular, FIG. 4A illustrates the steps performed by the first processing unit or port CPU 200, and FIG. 4B illustrates the steps performed by the second processing unit or RTP packet generator/receiver unit 202. In FIG. 4A, in step 400A, an event requiring a header update is detected for a stream. For example, in FIG. 2, wireless stack 208 may detect a handover event affecting a stream of packets for a particular UE. The handover event may be a simulated handover event generated by a test application (not shown) to test the functionality of an SGW in response to the handover event. In another example, the event requiring the header change may be a switch from a dedicated bearer channel to a default bearer channel. In step 402A, updated prepackaged header information is written to spare prepackaged header data store 216 in shared memory 204. In FIG. 2, RTP engine 206 writes the new prepackaged header information to spare prepackaged header data store 216. The updated information may include one or more of an updated source and destination MAC address, an updated outer source and destination IP address, an updated inner source and destination IP address, an updated TEID, and an updated type of service/differentiated services code point (ToS/DSCP) parameter value. In step 404A, after completing the writing of the updated prepackaged header information to the spare prepackaged header data store 216, a flag is updated to direct the second processing unit to use the updated GTP header for the transmit stream. For example, as illustrated in FIG. 2, RTP engine 206 may update flag 218 to direct RTP packet generator/receiver unit 202 to use the information stored in spare prepackaged header data store to 216 for the transmit stream.

Referring to FIG. 4B, the second processing unit, before transmitting a GTP encapsulated RTP packet, in step 400B, reads a flag. In FIG. 2, RTP packet generator/receiver unit 202 may read flag 218 to determine whether data store 214 or 216 stores the prepackaged header for the transmit stream. In step 402B, the second processing unit uses the prepackaged header indicated by the flag to generate a GTP packet. Referring to FIG. 2, RTP packet generator/receiver unit 202 uses the prepackaged header information indicated by flag 218 to form or update GTP packets being transmitted. In step 404B, the second processing unit transmits the GTP packet. Referring to FIG. 2, RTP packet generator/receiver unit 202 transmits GTP packets to the SGW under test.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for generating general packet radio service tunneling protocol (GTP) encapsulated real-time transport protocol (RTP) packets, the method comprising:
   in a long term evolution (LTE) node simulator:
   using a first processing unit to generate prepackaged headers for RTP payloads, wherein the prepackaged headers include GTP headers;
   communicating the RTP payloads and the prepackaged headers to a second processing unit comprising a unit of hardware or firmware separate from hardware or firmware used to implement the first processing unit;
   at the second processing unit, generating GTP packets by combining the prepackaged headers with the RTP payloads; and
   transmitting the GTP packets to a device under test.

2. The method of claim 1 wherein the prepackaged headers include GTP, RTP, user datagram protocol (UDP), Internet protocol (IP), and medium access control (MAC) headers.

3. The method of claim 1 wherein the LTE node simulator is configured to simulate at least one of: a user equipment (UE), an eNode B, and a mobility management entity.

4. The method of claim 1 wherein the first processing until comprises a port central processing unit and the second processing unit comprises an RTP packet generator/receiver field programmable gate array.

5. The method of claim 1 comprising generating GTP and RTP statistics at the second processing unit.

6. The method of claim 5 wherein generating GTP and RTP statistics includes generating GTP and RTP packet counts.

7. The method of claim 1 comprising dynamically updating prepackaged headers used in the GTP packets during the transmission of GTP packets.

8. The method of claim 7 wherein dynamically updating the prepackaged headers includes dynamically updating the prepackaged headers in response to a mobility event or a change in bearer channel.

9. The method of claim 8 wherein dynamically updating the prepackaged headers comprises:
   at the first processing unit, writing updated prepackaged header information to a spare prepackaged header data store and, after writing the updated prepackaged header information to the spare prepackaged header data store, updating a flag to direct the second processing unit to use the updated prepackaged header information in the spare prepackaged header data store for the stream.

10. The method of claim 9 wherein dynamically updating the prepackaged headers includes, at the second processing unit:
    reading the flag; and
    using the prepackaged header information indicated by the flag to generate the prepackaged headers for the transmit stream.

11. The method of claim 1 wherein communicating the prepackaged headers and the RTP payloads to the second processing unit includes writing the prepackaged headers and the RTP payloads to shared memory.

12. A system for generating general packet radio service tunneling protocol (GTP) encapsulated real-time transport protocol (RTP) packets, the method comprising:
a long term evolution (LTE) node simulator including:
a first processing unit configured to generate prepackaged headers for RTP payloads and to communicate the RTP payloads, wherein the prepackaged headers include GTP headers and the prepackaged headers; and
a second processing unit comprising a unit of hardware or firmware separate from hardware or firmware used to implement the first processing unit and configured to obtain the prepackaged headers and the RTP payloads, to assemble the GTP packets by combining the prepackaged headers with the RTP payloads and to transmit the GTP packets to a device under test.

13. The system of claim 12 wherein the prepackaged headers include GTP, RTP, user datagram protocol (UDP), Internet protocol (IP) and medium access control (MAC) headers.

14. The system of claim 12 wherein the LTE node simulator is configured to simulate at least one of a user equipment (UE), an eNode B, and a mobility management entity (MME).

15. The system of claim 12 wherein the first processing until comprises a port central processing unit and the second processing unit comprises an RTP packet generator/receiver field programmable gate array.

16. The system of claim 12 wherein the second processing unit is configured to generate GTP and RTP statistics at the second processing unit.

17. The system of claim 16 wherein the GTP and RTP statistics include GTP and RTP packet counts.

18. The system of claim 12 wherein the first and second processing units are configured to dynamically update the prepackaged headers used in the GTP packets during the transmission of GTP packets.

19. The system of claim 18 wherein the first and second processing units are configured to dynamically update the prepackaged headers in the prepackaged headers in response to a mobility event or a change in bearer channel.

20. The system of claim 19 wherein the first processing unit is configured to:
write updated prepackaged header information to a spare prepackaged header data store; and
after writing the updated prepackaged header information to the spare prepackaged header data store, update a flag to direct the second processing unit to use the updated prepackaged header information in the spare prepackaged header data store for the stream.

21. The system of claim 20 wherein the second processing unit is configured to:
read the flag; and
use the prepackaged header information indicated by the flag to generate the prepackaged headers for the transmit stream.

22. The system of claim 12 wherein the device under test comprises a serving gateway (SGW).

23. The system of claim 12 comprising a shared memory, wherein the first processing unit writes the prepackaged headers and the RTP payloads to the shared memory and wherein the second processing unit obtains the prepackaged headers and the RTP payloads from the shared memory.

24. A non-transitory computer readable medium having stored thereon executable instructions that when executed by the processor of a computer control the computer to perform steps comprising:
in a long term evolution (LTE) node simulator:
using a first processing unit to generate prepackaged headers for RTP payloads, wherein the prepackaged headers include GTP headers;
communicating the prepackaged headers to a second processing unit comprising a unit of hardware of firmware separate from hardware or firmware used to implement the first processing unit;
at the second processing unit, assembling GTP packets by combining the prepackaged headers with the RTP payloads; and
transmitting the GTP packets to a device under test.

* * * * *